Figure 5:
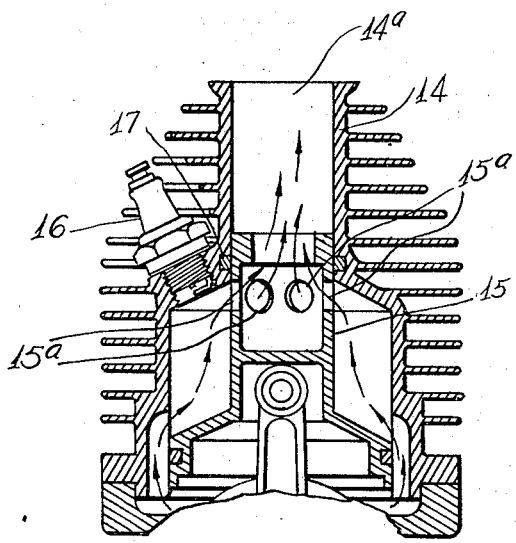

May 28, 1946.  D. S. SANBORN  2,401,111
TWO STROKE CYCLE INTERNAL-COMBUSTION ENGINE
Filed Nov. 20, 1944  2 Sheets-Sheet 1
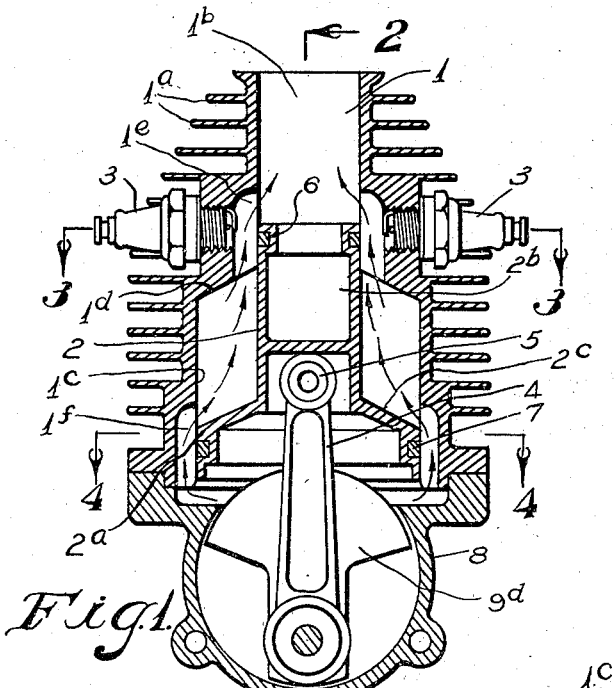
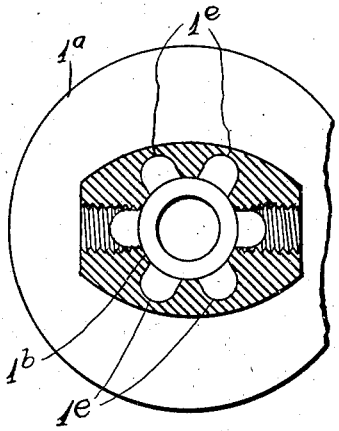
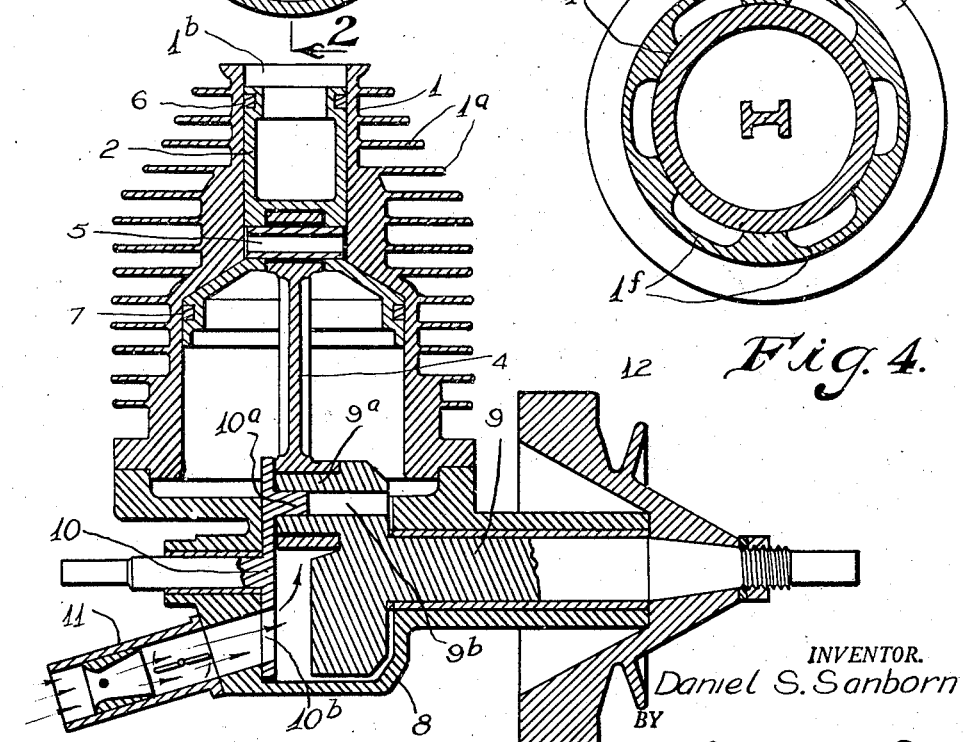
INVENTOR.
Daniel S. Sanborn
BY William H. Dean
AGENT.

May 28, 1946.          D. S. SANBORN          2,401,111
TWO STROKE CYCLE INTERNAL-COMBUSTION ENGINE
Filed Nov. 20, 1944          2 Sheets-Sheet 2

INVENTOR.
Daniel S. Sanborn
BY
William H. Dean
AGENT.

Patented May 28, 1946

2,401,111

UNITED STATES PATENT OFFICE 2,401,111

TWO-STROKE CYCLE INTERNAL-COMBUSTION ENGINE

Daniel S. Sanborn, San Diego, Calif.

Application November 20, 1944, Serial No. 564,230

12 Claims. (Cl. 123—73)

My invention relates to a two-stroke cycle internal combustion engine, more particularly of the crankcase carburetion type, and the objects of my invention are:

First, to provide an engine of this class having a combustion chamber which is scavenged from end to end resulting in stratification between the fresh and burned gases during the charging process;

Second, to provide an engine of this class having a combustion chamber which is uniformly scavenged about the periphery thereof by means of a plurality of radially disposed transfer passages at opposite ends of the combustion chamber;

Third, to provide an engine of this class in which the displacement of the piston at the crankcase side thereof exceeds the swept volume of the combustion chamber providing additional fuel mixture for thoroughly scavenging or supercharging the combustion chamber;

Fourth, to provide an engine of this class having a minimum of volume in the crankcase so that the pumping efficiency thereof is relatively high;

Fifth, to provide an engine of this class having a novel inlet and exhaust gas passage combination;

Sixth, to provide an engine of this class having novel exhaust passage means in connection with the piston thereof;

Seventh, to provide an engine of this class in which exhaust gases are vented through the cylinder bore thereof to atmosphere;

Eighth, to provide a novel cylinder and piston arrangement for use in various types of engines, compressors, or the like; and Ninth, to provide an engine of this class which is very simple and economical of construction, efficient in its action and which will not readily deteriorate or get out of order.

With these and other objects in view as will appear hereinafter, my invention consists of certain novel features of construction, combination and arrangement of parts and portions, and a certain modification, as will be hereinafter described in detail and particularly set forth in the appended claims, reference being had to the accompanying drawings and to the characters of reference thereon which form a part of this application, in which:

Figure 1 is a longitudinal sectional view of my engine; Fig. 2 is a longitudinal sectional view thereof taken from the line 2—2 of Fig. 1 showing the piston thereof in the up-stroke position; Fig. 3 is a fragmentary sectional view taken from the line 3—3 of Fig. 1 showing the engine sparkplugs removed; Fig. 4 is a sectional view taken from the line 4—4 of Fig. 1, and Fig. 5 is a longitudinal sectional view of a modified form of my engine.

Similar characters of reference refer to similar parts and portions throughout the several views of the drawings.

The cylinder 1, piston 2, spark plugs 3, connecting rod 4, wrist pin 5, piston rings 6 and 7, crankcase 8, crankshaft 9, rotary valve 10, carbureter 11 and the flywheel 12 constitute the principal parts and portions of my two-stroke cycle internal combustion engine.

The cylinder 1 is a hollow cylinder provided with annular cooling fins 1a on the outer side thereof and a reduced bore portion 1b at one end thereof and an enlarged bore portion 1c at the opposite end thereof. The reduced bore portion 1b is considerably smaller in diameter than the enlarged bore portion 1c, as shown best in Figs. 3 and 4 of the drawings and also in Fig. 1 of the drawings. The transition between the bore portions 1b and 1c is defined by an annular angular wall 1d, as shown best in Fig. 1 of the drawings. The bore portion 1b is provided with a plurality of radially disposed recesses 1e at the transition 1d and extending some distance toward the open end of the reduced bore portion 1b, as shown best in Figs. 1 and 3 of the drawings.

Communicating with two of these recesses 1e in opposed relation to each other are the spark plugs 3 which are secured in screwthreaded relation with the cylinder 1 which provide ignition in the recesses 1e which form part of the combustion chamber. It will be noted that these recesses 1e serve as exhaust or transfer passages for the scavenging of the products of combustion therethrough, as indicated by arrows in Fig. 1 of the drawings, when the piston 2 is in its furthermost position toward the crankcase 8.

The enlarged bore portion 1c communicating with the reduced bore portion 1b at the transition 1d serves as the major portion of the combustion chamber during the power stroke of the piston 2. This enlarged bore portion 1c is provided with radially disposed recesses 1f which communicate with the interior of the crankcase 8 and the opposite side of the enlarged diameter skirt portion 2a of the piston 2, all as shown best in Figs. 1 and 4 of the drawings. These recesses 1f serve as combustion chamber inlet passages or transfer means.

The piston 2 is reciprocally mounted in the cylinder 1 and is provided with a reduced diameter portion 2b connected to the enlarged diameter skirt portion 2a by the transition portion 2c which conforms angularly to the transition portion 1d of the cylinder 1. The piston ring 6 is positioned in a substantially conventional piston ring groove in the piston portion 2b and the piston ring 7 is positioned in a substantially conventional groove in the enlarged diameter skirt portion 2a, all as shown best in Fig. 1 of the drawings.

The wrist pin 5, as shown best in Fig. 2 of the drawings, is a substantially conventional internal combustion engine wrist pin on which the upper end of the connecting rod 4 is pivotally mounted and the crankshaft 9 is provided with a crankpin portion 9a on which the opposite end of the connecting rod 4 is journalled. This crankpin portion 9a is provided with a bore 9b therein adapted to retain the driving pin 10a of the rotary valve 10. This rotary valve 10 is rotatably mounted in the crankcase 8 and is provided with a passage opening 10b communicating with the carbureter 11, all as shown best in Fig. 2 of the drawings.

The flywheel 12 is a substantially conventional flywheel and is secured on the crankshaft 9 by means of the locknut 9c.

It will be here noted that the counterbalance 9d of the crankshaft 9 together with the crankpin 9a and the rotary valve 10 occupy a large percentage of the crankcase volume which is advantageous in crankcase carburetion due to relatively high pumping efficiency of the piston 2 in communicative relation therewith.

The operation of my two-stroke cycle internal combustion engine is substantially as follows: As shown in Fig. 1 of the drawings, the piston 2 is in the downstroke position wherein fresh fuel mixture in the crankcase is compressed and being relieved through the transfers 1f around the enlarged skirt portion 2a of the piston 2 and this fresh fuel mixture passes upwardly, as indicated by arrows, forcing the burned gases or products of combustion outwardly through the transfers 1e then to the reduced bore portion 1b of the cylinder 1 and to atmosphere. As the piston 2 passes upwardly the piston ring 7 passes the ends of the transfers 1f, while the piston ring 6 passes the transfers 1e, trapping the fresh fuel mixture between the transition portions 2c and 1d of the piston 2 and the cylinder 1, respectively.

When the piston 2 reaches the position as shown in Fig. 2 of the drawings, the spark plugs 3 provide ignition and the piston 2 is driven downwardly compressing the next charge of fresh fuel mixture in the crankcase 8.

It will be here noted that the compression stroke of the piston and the inlet of fuel mixture through the carbureter 11 into the crankcase 8 are simultaneous and that the charging of the combustion chamber with fresh fuel mixture and scavenging of exhaust gases therefrom are simultaneous.

It will be further noted that the port 10b in the rotary valve 10 is open as the piston travels upwardly in order to admit fresh fuel mixture to the crankcase and that the port 10b is out of register with the carbureter 11 when the piston passes downwardly compressing the fresh fuel mixture in the crankcase 8.

In the modified form of my invention, shown in Fig. 5 of the drawings, the cylinder 14 is substantially the same in construction except the transfer recesses 1e, as shown in Fig. 1 of the drawings, are omitted in the structure as shown in Fig. 5 of the drawings. These transfer recesses 1e are substituted for by the ports 15a in the piston 15. These ports 15a permit the exhaust gases to be exhausted through the interior of the piston and outwardly through the reduced bore portions 14a of the cylinder 14. The cylinder 14 is also provided with a piston ring groove 17 substituting for the groove in the piston. Only one sparkplug 16 is shown in Fig. 5 of the drawings. With the exception of the sparkplug 16 and the exhaust ports 15a in the piston 15, the omission of the transfers 1e as shown in Fig. 1 of the drawings, and the piston ring groove 17, the modified form as shown in Fig. 5 of the drawings is constructed and operates in substantially the same manner as that shown in Figs. 1 to 4, inclusive.

Though I have shown and described a particular construction, combination and arrangement of parts and portions, and a certain modification, I do not wish to be limited to this particular construction, combination and arrangement, nor to the modification, but wish to include in the scope of my invention the construction, combination and arrangement substantially as set forth in the appended claims.

Having thus described my invention, what I claim as new and desire to secure by Letters Patent is:

1. In a two-stroke cycle internal combustion engine, a cylinder having an enlarged diameter bore portion and a reduced diameter bore portion, a piston reciprocally mounted in said cylinder having an enlarged diameter skirt portion and a reduced diameter portion interconnected by a sloped transition portion, a crankcase communicating with said cylinder adjacent said enlarged diameter bore portion, exhaust passage means at the transition between said enlarged diameter bore portion and said reduced diameter bore portion communicating with atmosphere through said reduced diameter bore portion when said piston is in the down stroke position nearest said crankcase.

2. In a two-stroke cycle internal combustion engine, a cylinder having an enlarged diameter bore portion and a reduced diameter bore portion, a piston reciprocally mounted in said cylinder having an enlarged diameter skirt portion and a reduced diameter portion interconnected by a sloped transition portion, a crankcase communicating with said cylinder adjacent said enlarged diameter bore portion, exhaust passage means at the transition between said enlarged diameter bore portion and said reduced diameter bore portion communicating with atmosphere through said reduced diameter bore portion when said piston is in the down stroke position nearest said crankcase, intake passage means communicating with the interior of said crankcase and the opposite side of said enlarged diameter skirt portion of said piston when said piston is in the down stroke position nearest said crankcase.

3. In a two-stroke cycle internal combustion engine, a cylinder having an enlarged diameter bore portion and a reduced diameter bore portion, a piston reciprocally mounted in said cylinder having an enlarged diameter skirt portion and a reduced diameter portion interconnected by a sloped transition portion, a crankcase communicating with said cylinder adjacent said enlarged diameter bore portion, exhaust passage means at the transition between said enlarged diameter bore portion and said reduced diameter bore portion communicating with atmosphere through said reduced diameter bore portion when said piston is in the down stroke position nearest said crankcase, whereby exhaust gases pass outwardly through said reduced diameter bore portion above said reduced diameter piston portion.

4. In a two-stroke cycle internal combustion engine, a cylinder having an enlarged diameter bore portion and a reduced diameter bore portion, a piston reciprocally mounted in said cylinder having an enlarged diameter skirt portion and a reduced diameter portion, a crankcase communicating with said cylinder adjacent said enlarged diameter bore portion, exhaust passage means at the transition between said enlarged diameter bore portion and said reduced diameter bore portion when said piston is in the down stroke position nearest said crankcase, intake passage means communicating with the interior of said crankcase and the opposite side of said enlarged diameter skirt portion of said piston when said piston is in the down stroke position nearest said crankcase, said exhaust passage means in the form of a plurality of radially disposed recesses in the side wall of said reduced diameter bore portion, said intake passage means in the form of a plurality of radially disposed recesses in the side wall of said enlarged diameter bore portion.

5. A cylinder having an enlarged diameter bore portion and a reduced diameter bore portion, a piston reciprocally mounted in said cylinder having an enlarged diameter skirt portion and a reduced diameter portion interconnected by a sloped transition portion, and transfer passage means at the transition between said enlarged diameter bore portion and said reduced diameter bore portion communicating with atmosphere through said reduced diameter bore portion when said piston is in the farthest position opposite said reduced diameter bore portion.

6. A cylinder having an enlarged diameter bore portion and a reduced diameter bore portion, a piston reciprocally mounted in said cylinder having an enlarged diameter skirt portion and a reduced diameter portion interconnected by a sloped transition portion, and transfer passage means at the transition between said enlarged diameter bore portion and said reduced diameter bore portion communicating with atmosphere through said reduced diameter bore portion when said piston is in the farthest position opposite said reduced diameter bore portion, transfer passage means communicating with the opposite ends of said enlarged diameter skirt portion of said piston when said piston is in the farthest position opposite said reduced diameter bore portion.

7. In a two-stroke cycle internal combustion engine, a cylinder having an enlarged diameter bore portion and a reduced diameter bore portion, a piston reciprocally mounted in said cylinder having an enlarged diameter skirt portion and a reduced diameter portion, a crankcase communicating with said cylinder adjacent said enlarged diameter bore portion, exhaust passage means at the transition between said enlarged diameter bore portion and said reduced diameter bore portion communicating with atmosphere through said reduced diameter bore portion when said piston is in the down stroke position nearest said crankcase, intake passage means communicating with the interior of said crankcase and the opposite side of said enlarged diameter skirt portion of said piston when said piston is in the down stroke position nearest said crankcase, carburetion inlet valve means in communication with the interior of said crankcase.

8. In a two-stroke cycle internal combustion engine, a cylinder having an enlarged diameter bore portion and a reduced diameter bore portion, a piston reciprocally mounted in said cylinder having an enlarged diameter skirt portion and a reduced diameter portion, a crankcase communicating with said cylinder adjacent said enlarged diameter bore portion, exhaust openings in said piston near the transition between said enlarged diameter bore portion and said reduced diameter bore portion communicating with atmosphere through said reduced diameter bore portion when said piston is in the down stroke position nearest said crankcase.

9. A cylinder having an enlarged diameter bore portion and a reduced diameter bore portion, a piston reciprocally mounted in said cylinder having an enlarged diameter skirt portion and a reduced diameter skirt portion, and transfer passage means at the transition between said enlarged diameter bore portion and said reduced diameter bore portion when said piston is in the farthest position opposite the said reduced diameter bore portion, said piston having a hollow small diameter portion and a hollow large diameter portion and a closed diaphragm portion in said piston, said hollow small diameter portion and said hollow large diameter portion open at opposite sides of said diaphragm portion.

10. A cylinder having an enlarged diameter bore portion and a reduced diameter bore portion, a piston reciprocally mounted in said cylinder having an enlarged diameter skirt portion and a reduced diameter skirt portion, and transfer passage means at the transition between said enlarged diameter bore portion and said reduced diameter bore portion when said piston is in the farthest position opposite the said reduced diameter bore portion, said piston having a hollow small diameter portion and a hollow large diameter portion and a closed diaphragm portion in said piston, said hollow small diameter portion and said hollow large diameter portion open at opposite sides of said diaphragm portion, said small diameter portion of said piston provided with exhaust openings in the side-wall thereof through which products of combustion may pass at one side of said diaphragm portion.

11. A cylinder having an enlarged diameter bore portion and a reduced diameter bore portion, a piston reciprocally mounted in said cylinder having an enlarged diameter skirt portion and a reduced diameter portion, and radially disposed transfer passage means at the transition between said enlarged diameter bore portion and said reduced diameter bore portion when said piston is in the farthest position opposite said reduced diameter bore portion, transfer passage means communicating with the interior of said large diameter bore portion of said cylinder when said piston is in the farthest position opposite said reduced diameter bore portion.

12. In a two-stroke cycle internal combustion engine, a cylinder having an enlarged diameter bore portion and a reduced diameter bore portion, a piston reciprocally mounted in said cylinder having an enlarged diameter skirt portion and a reduced diameter portion, a crankcase communicating with said cylinder adjacent said enlarged diameter bore portion, exhaust passage means at the transition between said enlarged diameter bore portion and said reduced diameter bore portion when said piston is in the down stroke position nearest said crankcase, intake passage means communicating with the interior of said crankcase and the opposite side of said enlarged diameter skirt portion of said piston when said piston is in the down stroke position nearest said crankcase, said exhaust passage means in the form of a plurality of radially disposed recesses in the side wall of said reduced diameter bore portion, said intake passage means in the form of a plurality of radially disposed recesses in the side wall of said enlarged diameter bore portion, the crankcase volume displaced by the large diameter piston portion substantially greater than the displaced volume of the combustion chamber.

DANIEL S. SANBORN.